United States Patent
Altman et al.

(10) Patent No.: US 11,671,159 B2
(45) Date of Patent: Jun. 6, 2023

(54) METHOD FOR BEAM SELECTION AND BASE STATION FOR IMPLEMENTING SAME

(71) Applicant: Orange, Paris (FR)

(72) Inventors: Zwi Altman, Chatillon (FR); Deepak Nayak, Bangalore (IN); Suresh Kalyanasundaram, Bangalore (IN); Philippe Sehier, Saint Germain en Laye (FR)

(73) Assignee: ORANGE, Issy-les-Moulineaux (FR)

( * ) Notice: Subject to any disclaimer, the term of this patent is extended or adjusted under 35 U.S.C. 154(b) by 134 days.

(21) Appl. No.: 17/097,973

(22) Filed: Nov. 13, 2020

(65) Prior Publication Data

US 2021/0152231 A1 May 20, 2021

(30) Foreign Application Priority Data

Nov. 14, 2019 (FR) ...................... 1912696

(51) Int. Cl.
*H04B 7/06* (2006.01)
*H04B 7/0452* (2017.01)

(52) U.S. Cl.
CPC ......... *H04B 7/0695* (2013.01); *H04B 7/0452* (2013.01); *H04B 7/0634* (2013.01)

(58) Field of Classification Search
CPC .. H04B 7/0695; H04B 7/0452; H04B 7/0634; H04B 7/046
See application file for complete search history.

(56) References Cited

U.S. PATENT DOCUMENTS

| | | | |
|---|---|---|---|
| 2011/0206154 A1* | 8/2011 | Ding | H04B 7/0632 375/267 |
| 2014/0051351 A1 | 2/2014 | Jia | |
| 2018/0159600 A1 | 6/2018 | Kim et al. | |

OTHER PUBLICATIONS

French Search Report dated Jun. 18, 2020 for Application No. 1912696.

* cited by examiner

*Primary Examiner* — Minh Trang T Nguyen
(74) *Attorney, Agent, or Firm* — Knobbe, Martens, Olson & Bear, LLP

(57) ABSTRACT

A method is described of selecting, by a multi-antenna base station of a wireless communications system, at least one transmission beam to transmit data to at least one terminal. The method can include determining a grid of N2 transmission beams intended to cover a portion of the space served by the base station and generated by using N1 antennas of the base station, where N1 and N2 designate integers such as N2>N1, and selecting one or more non-adjacent beam(s) of the grid to transmit data to at least one terminal during at least one given time interval.

15 Claims, 5 Drawing Sheets

[Fig. 1A]
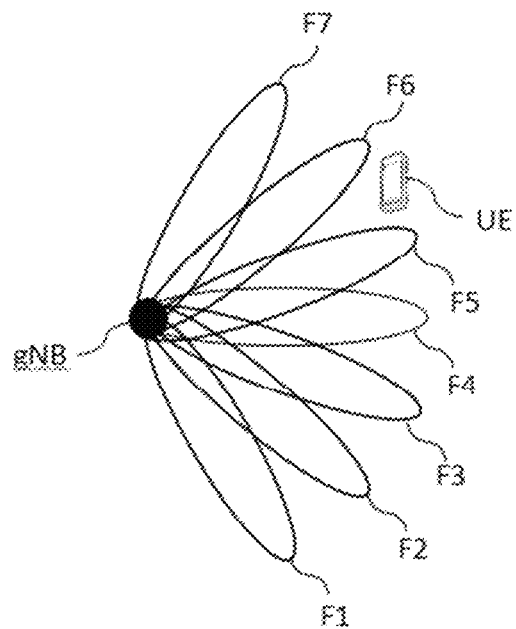
[Fig. 1B]
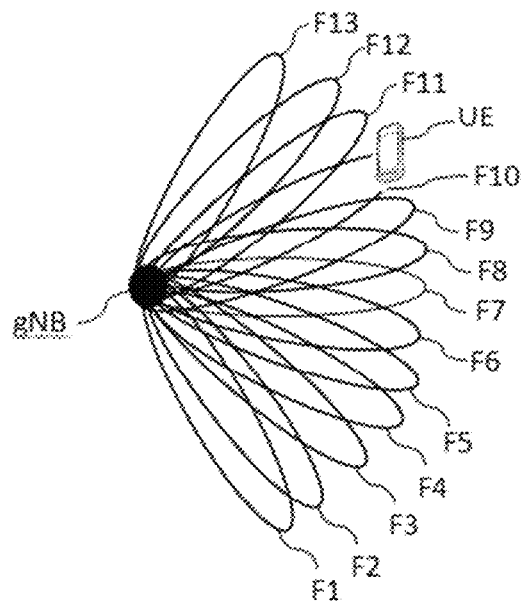

[Fig. 2]
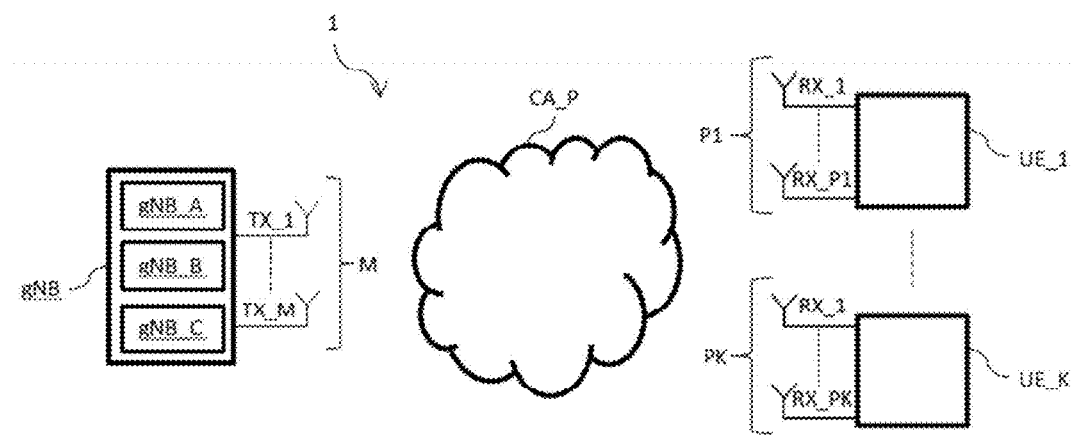
[Fig. 3]
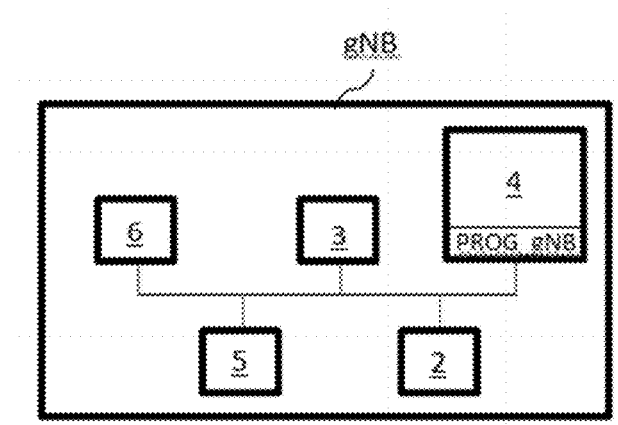

[Fig. 4]
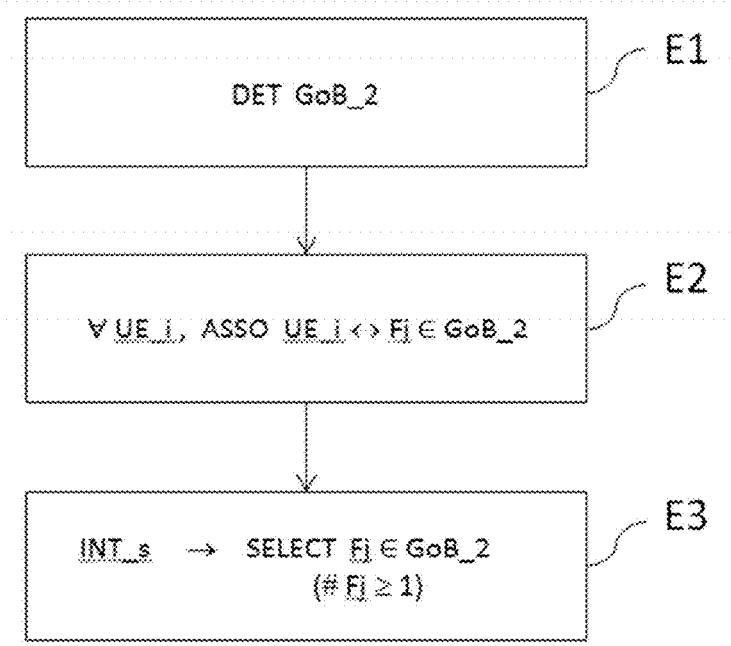
[Fig. 5]
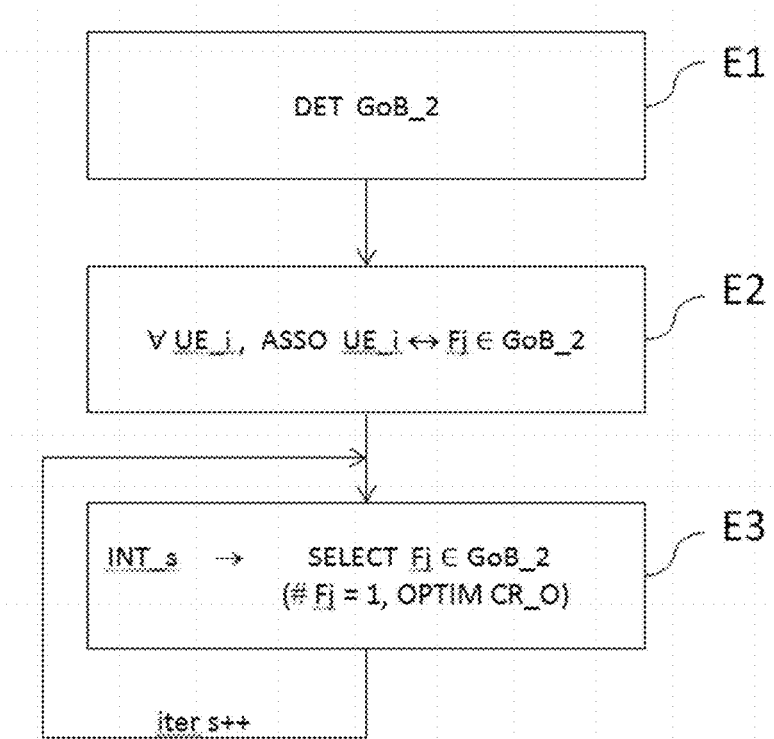

[Fig. 6]
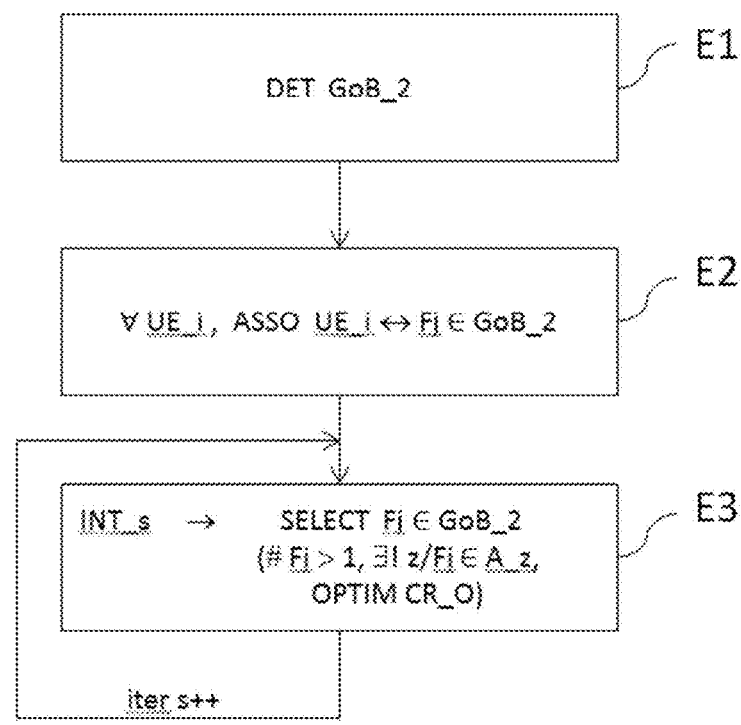

[Fig. 7]
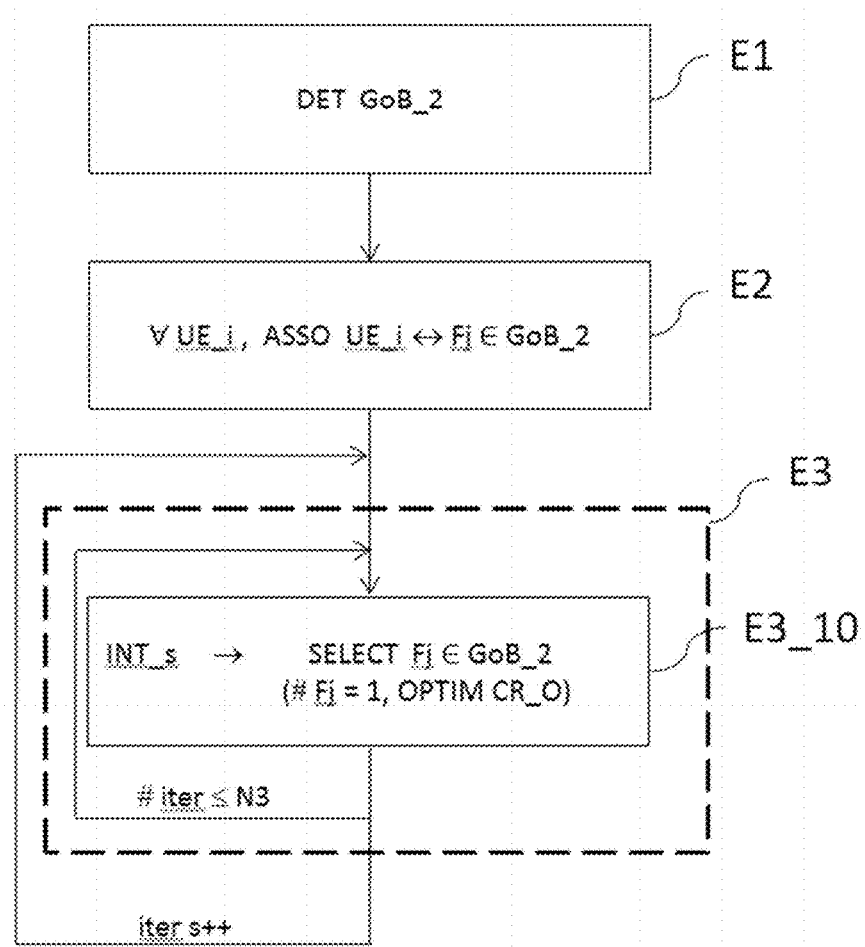
[Fig. 8]
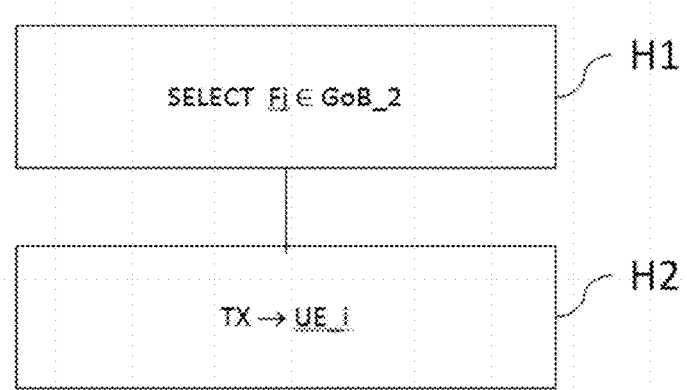

METHOD FOR BEAM SELECTION AND BASE STATION FOR IMPLEMENTING SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to French application No. 1912696, filed Nov. 14, 2019, which is hereby incorporated by reference in its entirety.

BACKGROUND

Technical Field

The disclosed technology relates to the general field of telecommunications, and in particular wireless communications implemented on radio-type networks such as mobile networks (e.g. 3G, 4G, 5G, etc.), WiFI, etc.

Description of Related Technology

The disclosed technology relates more particularly to a method for selecting by a multi-antenna base station of a wireless communications system, said selection relating to one or several beam(s) among a set of beams intended for the transmission of data towards at least one terminal attached to the base station. It also relates to a method for emitting data by said base station and towards said at least one terminal. The disclosed technology finds a particularly advantageous application, although without limitation, in the case of a MIMO (Multiple Input Multiple Output) type communications system using several antennas in emitting and in receiving mode, and in particular in the case of a massive MIMO-type communications system based on a large number of antennas (typically from 64 to 128 antennas at the current base stations, this number being caused to increase in the future).

In order to adapt to the continuous and ever faster growth in the data traffic emitted by the wireless communications systems, various technologies are today being implemented, or being improved for optimum use in the years to come.

Among these technologies, in the context of MIMO-type wireless communications systems, base stations can be configured with the aim of transmitting simultaneously, to the terminal and by using the same radio resources (e.g. radio frequencies), several data flows via several emitting antennas of said base station. The simultaneous transmission of these data flows can take place thanks to the formation of directional transmission beams (also called "beamforming"). The use of such beams thus allows the base station to deliver data to the terminal with high spectral efficiency.

In practice, this beam generation technology can be available according to different implementations. For this purpose, the use of a grid of beams, that is to say a set of beams pointing respectively in given directions of a determined portion of the space, can be used order to ensure at least partly the coverage of the communication cell associated with the base station. Such an implementation is described extensively in the state of the art. By way of non-limiting example, mention can be made to the scientific publication: "DFT beamforming for more accurate estimate of signal DOA with application to improving DS/CDMA receiver performance", T. B. Vu, Electronics Letters, vol. 36, no. 9, pp. 834-836, 2000, which describes a technique allowing to generate a grid of N transmission beams from N antennas.

The use of a grid of beams has several advantages. On the one hand, it allows extending the radio coverage of the base station in the directions respectively associated with the beams. On the other hand, it allows, for a terminal covered by one of the beams of the grid (i.e. a terminal able to receive data conveyed by one of the beams of the grid), increasing the data throughput to the terminal (and therefore ultimately also the power received thereby) as the position of this terminal approaches the main lobe associated with said beam.

However, the directivity of the beams also implies that the power distribution generated by the base station varies in the portion of the space covered by the grid of beams. Indeed, a given position within said portion may be for example contained in a single main lobe associated with a beam, or contained in the intersection of two main lobes respectively associated with two distinct beams, or not be contained in any main lobe of a beam. Thus, the power received by a terminal occupying a given position within the portion of the space covered by the grid of beams, but whose said position is not contained in any main lobe of a beam of the grid, will not be optimal (i.e. degraded quality of service). In other words, the counterparty to obtain a data transmission with high spectral efficiency lies in the fact that the radiated electromagnetic power is strongly attenuated in the vicinity of a beam, and therefore ultimately between the beams themselves.

Such a situation is illustrated without limitation in FIG. 1A which schematically represents beams F1 to F7 emitted simultaneously by a base station gNB of one possible embodiment, from a first grid implemented at said base station gNB. More particularly, FIG. 1A corresponds to a representation in a horizontal plane, also referred to as an "azimuth plane", and in the form of a radiation diagram, of the main lobes respectively associated with the beams F1 to F7 of said first grid.

For the sake of simplicity of the description, it is considered here that a beam is identical to its main lobe. In the example of FIG. 1A, each beam Fj, for j comprised in the interval [2, 6], is surrounded by two beams Fj+1 and Fj−1 adjacent thereto (for example, the beams F3 and F5 are both adjacent to the beam F4). The beam F1 (respectively the beam F7) is for its part adjacent to only one other beam, namely the beam F2 (respectively the beam F6). Furthermore, in FIG. 1A, said beams F1 to F7 all have an identical opening angle and are uniformly angularly distributed in said horizontal plane (i.e. the angles separating the main directions associated with two adjacent beams in the horizontal plane are all equal to each other).

A user terminal UE, here taking the form of a cellular phone, for example of the Smartphone type, is also represented in FIG. 1A. This user terminal UE is positioned in the portion of the space covered by the first grid of beams, more specifically between the beams F5 and F6 of the first grid so that its user experience is degraded (little power received). More particularly, the attenuation experienced, in terms of power, between a theoretical position of the UE terminal contained in one of the beams (for example F5 or F6) and the actual position thereof is on the order of 10 dB.

Therefore, in order to reduce the variation of power received within the portion of the space served by a base station, methods have been proposed to increase the number of beams of such a first grid initially implemented at said base station. These methods, called "oversampling"-type methods, allow the base station to determine, based on the first grid, a second grid containing the beams of said first grid as well as new beams positioned therebetween.

Proceeding in this way therefore allows increasing the beam density in the portion of the space that the base station must cover. Thus, the probability that terminal, which is initially outside any beam of the first grid, becomes in a beam of the second grid, increases.

FIG. 1B schematically represents an evolution of the configuration of FIG. 1A, after a second grid, corresponding to an oversampling of the first grid, has been determined, in accordance with one possible embodiment, by the base station gNB.

As illustrated in FIG. 1B, the station gNB can now emit beams F1 to F13 simultaneously (or sequentially as part of a scanning of the beams to allow terminals to select an appropriate beam, also referred to as beamsweeping), being understood that a beam Fi of the second grid corresponds to a beam Fj of the first grid for i equal to 2j−1 (j varying from 1 to 7). In addition, each beam Fi of the second grid for i even is positioned between two adjacent beams common to the first grid.

Thus, the new beam F10 is here positioned between the beams F9 and F11 (corresponding respectively to the beams F5 and F6 of FIG. 1A), the terminal UE now being contained in said beam F10, thus benefiting, in comparison with the situation illustrated by FIG. 1A, from a greater received power, so that its user experience is improved.

However, the oversampling methods are not without drawbacks. Indeed, the corresponding increase in the density of beams necessarily introduces a greater overlap therebetween, even more particularly between adjacent beams, in comparison with the situation where only the first grid is used. However, because of this increased overlap, the radio waves conveyed by each of the beams are more likely to interfere with each other. Such interferences, designated by the expression "inter-beam interferences" in the remainder of the description, contribute to the degradation of the radio transmission conditions, and therefore ultimately to a degradation in the quality of service delivered to a user (resulting for example in a bad signal to interference plus noise ratio at the user level). Thus, although a terminal can benefit from a gain in the received power through the use of a second grid generated by oversampling, this advantage is at least partly counterbalanced by the presence of said interferences. Consequently, the good operation of the terminal is compromised.

SUMMARY

The disclosed technology addresses all or part of the drawbacks of other embodiments, in particular those exposed above, by proposing a solution that allows a terminal of a wireless communications system to receive, from a base station, a good level of electromagnetic power, while effectively limiting the presence of inter-beam interference at said terminal. Thus, compared with the solutions of alternative embodiments, the operation of said terminal is greatly improved.

To this end, and according to a first aspect, the disclosed technology relates to a method for selecting, by a multi-antenna base station of a wireless communications system, at least one transmission beam to transmit data to at least one terminal, said method comprising:

a step of determining a grid of N2 transmission beams intended to cover a portion of the space served by the base station and generated by using N1 antennas of the base station, N1 and N2 designating integers such as N2>N1, a step of selecting one or more non-adjacent beam(s) of said grid to transmit data to said at least one terminal during at least one given time interval.

Thus, the grid determined by the base station corresponds in a way to an oversampling of a grid of N1 beams generated by using N1 antennas, as described in the article by T. B. Vu mentioned above. Such a grid can be generated as in the article by using a properly dimensioned DFT transform. It is noted that N1 does not necessarily designate the total number of antennas available at the base station, but may correspond to a subset of them, in particular in a particular plane (for example in a horizontal plane or in a vertical plane). Thus, it can be envisaged that the base station is equipped with an antenna array comprising N1×N1' antennas. Likewise, the disclosed technology is not limited to determining a grid of uniformly spaced beams in a given plane. In particular, depending on the position of the terminals to be covered by the base station, it is possible to envisage a greater beam density in one or more direction(s) and more spaced beams in other directions. In other words, the oversampling envisaged with respect to a grid comprising N1 beams is not necessarily uniform.

Thanks to this "oversampling", the power variation received within the portion of the space served by the base station and covered by said N2 beams is smaller than the power variation that would be obtained with a grid of N1 beams as mentioned above Consequently, the probability that a terminal served by the base station is contained in the center of the main lobe of a beam of the grid of N2 beams is greater than the corresponding probability calculated for a grid of N1 beams.

Once the grid of N2 beams has been determined, the disclosed technology proposes to select at least one beam from this grid. The selected beam(s) are the only beams among the beams of the grid that are generated and used at a given time by the base station (that is to say emitted) to transmit data.

In addition, the constraint imposed on the selection made amounts to considering that if several beams are selected among the N2 beams, these selected beams cannot be adjacent to each other and thus form a set of non-adjacent beams. By "set of non-adjacent beams", reference is made here to the fact that any two beams chosen from said set are always separated in a plane of the space that intersects said two beams chosen by at least one of the unselected N2 beams.

The disclosed technology is therefore remarkable in that it proposes a solution that allows combining the advantages of a grid oversampling with those of an appropriate selection of at least one beam to cover terminals attached to the base station.

Indeed, the oversampling allows an increase in the beam density in the portion of the space that the base station must cover. Thanks to this density increase, the disclosed technology offers the possibility of ensuring that a terminal located in this portion of the space can receive a good level of electromagnetic power from the base station.

In addition, by avoiding the selection of the adjacent beams, the overlap between said selected beams is considerably reduced, only when they are generated simultaneously during a time interval. Thus, with this reduction in the overlap of the beams, the disclosed technology offers the possibility of effectively limiting, during a data emission, the inter-beam interferences at a terminal served by the base station.

As a consequence of these combined advantages (assurance of achieving a good level of received power, effective limitation of the inter-beam interferences), the disclosed technology offers the possibility of improving the operation of a terminal served by the base station.

In particular modes of implementation, the selection method may further include one or more of the following characteristics, taken separately or in all the technically possible combinations.

In a particular mode of implementation:
the selection step is iterated for a plurality of time intervals,
a single beam associated with at least one terminal is selected for each time interval to transmit data to said at least one terminal associated with said beam, said selected beam and said at least one associated terminal optimizing a cost function during the iteration of the selection step considered for said time interval.

This cost function may be in particular a function characterizing the performances achieved on the cell during said time interval, while possibly taking into account some constraints (e.g. fairness between the terminals, etc.). It may depend on one or more metrics reflecting the quality of the transmission at the terminals (such as the signal to interference plus noise ratio (SINR), the data throughput, the quality of the signal, the state of a given buffer memory, the latency, etc.) Such a function is for example a max(min(SINR)) function evaluated on the set of the possible beam/terminal combinations or max(average(SINR)) function. Of course, other functions can be envisaged.

To optimize this cost function, various approaches can be envisaged. If an analytical solution exists or an optimal algorithm allows obtaining with reasonable complexity a solution to optimize this cost function, then it can be implemented by the base station during the selection step at each iteration.

As a variant, a sub-optimal approach can be envisaged consisting in selecting beams and terminals optimizing during each iteration a given ordering criterion. This approach offers a solution to maximize the performances on the cell, reasonable in terms of complexity.

For example, in a particular mode of implementation, said method includes, prior to the selection step, a step of associating a plurality of terminals with respective beams of the grid, and:
the selection step is iterated for a plurality of time intervals,
a single beam is selected for each time interval, said selected beam being the beam associated with at least one terminal optimizing, during the iteration of the selection step considered for said time interval, a given ordering criterion applied to at least part of said plurality of terminals.

The mode of implementation in which a single terminal is associated with the beam, aims at a single-user emission at a given instant from the base station, also commonly designated by SU-MIMO ("SU" being the acronym of "Single User"). It is simple to implement, both in terms of hardware and software, which allows limiting the production cost of embodiments of the disclose technology.

As a variant, it is possible to envisage a mode of implementation in which the same beam is used to serve several terminals simultaneously. In this mode of implementation, it is further possible to use frequency multiplexing to distinguish the terminals and limit the interference generated therebetween.

The cost function and the ordering criterion allow taking into account, at the time of their evaluation, relative priorities between terminals, these priorities being defined by the very nature of the cost function or of the ordering criterion considered. In other words, the cost function, respectively the ordering criterion, allows creating a hierarchy between the terminals, this hierarchy being advantageously satisfied due to the fact that the selection of a beam is made with regard to an optimization of the cost function, respectively of the ordering criterion.

Like the cost function, the ordering criterion can be a function of one or more metrics reflecting the quality of the transmission at the terminals. For example, the ordering criterion is defined as the proportional fairness metrics. This metrics evolves over time insofar as it allows taking into account the consumption of radio resources allocated by the base station to each terminal served by said base station. More particularly, said proportional fairness metrics is equal to the ratio between the instantaneous data throughput obtained at a terminal served by the base station and an average data throughput obtained over a given time interval at the same terminal. Consequently, considering this proportional fairness metrics to prioritize terminals relative to each other amounts to maximizing a cost function corresponding to the sum of the logarithms of the average throughputs respectively associated with these terminals. The proportional fairness metrics is described, for example, in the following publications:

"Allocation of the radio resources in LTE", F. Bendaoud, M. Abdennebi, F. Didi, International Congress on Telecommunication and Application'14, Algeria, 23-27 Apr. 2014;

"Performance of Proportional Fair Scheduling for Downlink PD-NOMA Networks", IEEE Transactions on Wireless Communications, vol. 17, issue 10, 2018.

However, no limitation is attached to the ordering criterion considered for this mode of implementation or, more broadly, for the disclosed technology as a whole.

For example, the ordering criterion can be based on any one of the metrics among at least:
a proportional fairness metrics;
an exponential proportional fairness metrics;
a weighted proportional fairness metrics;
a Max-Min fairness metrics;
a fair queuing metrics;
a maximum throughput metrics;
a metrics depending on the services provided to the terminals; etc.

This list is given only as an illustration, and other scheduling criteriacriterion can still be envisaged as a variant, such as for example a Round Robin type criterion.

In a particular mode of implementation, a plurality of beams is selected to serve a plurality of terminals attached to the base station during said at least one time interval.

The fact of considering several beams for a given time interval offers the possibility of simultaneously transmitting data towards a plurality of terminals served by the base station. Such a mode of implementation thus aims a multi-user emission at a given instant from the base station, also commonly referred to as MU-MIMO ("MU" being the acronym of Multiple User). It should be noted that as mentioned above, the same beam can be used to serve a single user or several users simultaneously, in which case additional (for example frequency) multiplexing is preferably envisaged to separate the users served by the same beam.

Accordingly, during a time interval, several terminals served by the beams selected for this time interval will be able to benefit from the advantages of the disclosed technology. Their respective operations can therefore be improved.

In a particular mode of implementation, the beams are associated with distinct respective indices, said beams being grouped, based on their respective indices, in predetermined sets, the beams selected for said at least one time interval being the beams belonging to one of said predetermined sets.

Because said sets are predetermined, the implementation of this particular mode is facilitated, both in terms of hardware and software, which allows limiting the cost of carrying out embodiments of the disclose technology.

In a particular mode of implementation, the selection step includes a sub-selection of the beam associated with at least one terminal optimizing, during the implementation of said sub-selection, a cost function evaluated on at least part of said plurality of terminals, said sub-selection being iterated at most a determined number of times N3, and said at least part of terminals considered during an iteration of the sub-selection being formed of terminals whose associated beams are separated from the beams selected during the previous iterations by at least one beam.

This particular mode constitutes an implementation alternative to the mode in which the beams are selected from said predetermined sets. Besides the fact of offering the possibility of simultaneously transmitting data towards a plurality of terminals served by the base station, this mode of implementation inherits the advantages related to the evaluation, during each iteration of said sub-step, of the ordering criterion.

As a variant, said method includes, prior to the selection step, a step of associating said plurality of terminals with respective beams of the grid, the selection step including a sub-selection of the beam associated with a terminal optimizing, during the implementation of said sub-selection, a given ordering criterion applied to at least part of said plurality of terminals, said sub-selection being iterated at most a determined number of times N3, and said at least part of terminals considered during an iteration of the sub-selection being formed of terminals whose associated beams are separated from the beams selected during the previous iterations by at least one beam.

The ordering criterion considered here is similar to the one mentioned previously for the case where a single beam is selected during a time interval, and can therefore be based on a metrics chosen from a list identical to the one given for this case.

In a particular mode of implementation, the base station is configured to emit simultaneously N4 transmission beams, the number N3 being equal to N4.

In a particular mode of implementation, the selection step is iterated for a plurality of time intervals distinct from each other.

In a particular mode of implementation, the association of a terminal with a beam of the grid can be made based on information received from said terminal reflecting a level of quality of a transmission of data towards said terminal using said beam.

This information can be of different kinds. Thus, it may for example be an index or a set of ordered indices corresponding to the beams optimizing a given quality criterion at the terminal (for example, optimizing the instantaneous throughput, the received power, the signal to interference plus noise ratio, etc.), or a transmission quality indicator (also referred to as CQI for Channel Quality Information), etc.

According to a second aspect, the disclosed technology relates to a method for transmitting, by a multi-antenna base station of a wireless communications system, data to at least one terminal, said transmission method including:
    a step of selecting at least one transmission beam to transmit data to said at least one terminal according to a selection method in accordance with the disclosed technology,
    a step of transmitting data to said at least one terminal by means of said at least one selected beam.

This transmission method, since it is based essentially on the selection method according to embodiments of the disclosed technology, benefits from the advantages already mentioned above for said selection method.

According to a third aspect, the disclosed technology relates to a computer program including instructions for implementing a selection method according to embodiments of the disclose technology or a transmission method according to embodiments of the disclosed technology when said program is executed by a computer.

This program can use any programming language, and be in the form of source code, object code or intermediate code between source code and object code, such as in a partially compiled form, or in any other desirable form.

According to a fourth aspect, the disclosed technology relates to a computer-readable information or recording medium on which a computer program is recorded.

The information or recording medium can be any entity or device capable of storing the program. For example, the medium may include a storage means, such as a ROM, for example a CD ROM or a microelectronic circuit ROM, or a magnetic recording means, for example a floppy disc or a hard disk.

On the other hand, the information or recording medium can be a transmissible medium such as an electrical or optical signal, which can be conveyed via an electrical or optical cable, by radio or by other means. The program can be particularly downloaded from an Internet type network.

Alternatively, the information or recording medium can be an integrated circuit in which the program is incorporated, the circuit being adapted to execute or to be used in the execution of the method in question.

According to a fifth aspect, the disclosed technology relates to a multi-antenna base station of a wireless communications system, said base station including:
    a determination module, configured to determine a grid of N2 transmission beams intended to cover a portion of the space served by the base station and generated by using N1 antennas of the base station, N1 and N2 designating integers such that N2>N1,
    a selection module, configured to select one or more non-adjacent beam(s) of said grid to transmit data to at least one terminal during at least one given time interval,
    communication means, configured to transmit, using the selected beam(s), said data to said at least one terminal during said at least one time interval.

According to a sixth aspect, the disclosed technology relates to a wireless communications system including at least one base station as well as at least one terminal attached to said at least one base station.

BRIEF DESCRIPTION OF THE DRAWINGS

Other characteristics and advantages of the disclosed technology will emerge from the description given below, with reference to the appended drawings which illustrate an exemplary embodiment thereof without any limitation.

FIG. 1A schematically represents beams emitted simultaneously by a base station of one possible embodiment, from a first grid implemented at said base station.

FIG. 1B schematically represents an evolution of the configuration of FIG. 1A, after a second grid, corresponding to an oversampling of the first grid, has been determined, by the base station of FIG. 1A.

FIG. 2 schematically represents, in its environment, a particular embodiment of a wireless communications system.

FIG. 3 schematically represents an example of the hardware architecture of a base station.

FIG. 4 represents, in the form of a flowchart, the main steps of a selection method as implemented by the base station of FIG. 3.

FIG. 5 schematically represents a first mode of implementation of the selection method of FIG. 4.

FIG. 6 schematically represents a second mode of implementation of the selection method of FIG. 4.

FIG. 7 schematically represents a third mode of implementation of the selection method of FIG. 4.

FIG. 8 represents, in the form of a flowchart, the main steps of a transmission method as implemented by the base station of FIG. 3.

DETAILED DESCRIPTION

FIG. 2 schematically represents, in its environment, a particular embodiment of a wireless communications system 1.

As illustrated in FIG. 2, the wireless communications system 1 is a multi-antenna or MIMO system comprising:
- a base station gNB, equipped with M emitting antennas $TX\_1, TX\_2, \ldots, TX\_M$ (M designating an integer greater than 1);
- a plurality of terminals $UE\_1, UE\_2, \ldots, UE\_K$ attached to the base station gNB, each terminal UE_i being equipped with Pi receiving antennas $RX\_1, RX\_2, \ldots, RX\_Pi$ (K and Pi designating integers greater than 1).

Thus, in the embodiment described here, it is considered that the communications system 1 includes a plurality of terminals. The number K of these terminals does not constitute a limiting factor of the disclosed technology. However, in order to simplify the description, it is considered here that K designates the number of terminals capable of being active simultaneously at a given instant to receive data from the base station gNB. In the current state of the art, such a number K is generally comprised between 2 and 8. It should also be noted that the disclosed technology remains applicable to a wireless communications system comprising a single terminal.

According to this embodiment, the number M of emitting antennas of the base station gNB is much greater than the number K of terminals. For example, the number M of emitting antennas is comprised between 64 and 128 so that for a number K comprised between 2 and 8, the wireless communications system 1 is considered as massive MIMO-type system. However, nothing excludes considering a communications system 1 of another type (non-massive MIMO, MISO, etc.).

A terminal UE_i (i being an index comprised between 1 and K) corresponds for example to a cellular phone, for example of the Smartphone type, a touch pad, a personal digital assistant, a personal computer, etc. In general, no limitation is attached to the form taken by a terminal UE_i provided that it is able to communicate with the base station gNB.

In addition, a terminal UE_i can occupy a fixed position or be mobile, the disclosed technology equally applying to either of these configurations. For the rest of the description, and in order to facilitate the presentation of embodiments of the disclosed technology, it is considered without limitation that the terminals $UE\_1, UE\_2, \ldots, UE\_K$ occupy respective fixed positions.

According to the disclosed technology, the terminals $UE\_1, UE\_2, \ldots, UE\_K$ can be classified together so as to optimize a cost function aiming at maximizing the performances achieved on the cell covered by the base station gNB. It should be noted that depending on the conditions envisaged for the data transmissions by the base station gNB (e.g. one or more user(s) served by the same transmission beam emitted by the base station, frequency multiplexing, fairness between the users, etc.), this cost function can be optimized under different constraints reflecting these conditions.

Various cost functions can be envisaged, such as for example max(min SINR) or max(average SINR) optimized on all or part of the terminals, possibly under constraints. To achieve such an optimization with a reasonable complexity, in the embodiment described here, the terminals $UE\_1, \ldots UE\_K$ are classified by means of an ordering criterion noted here CR_O evaluated by the base station gNB. This approach may turn out to be sub-optimal but it has the advantage of being able to be implemented with an acceptable complexity.

More particularly, in the embodiment described here, for example for scheduling the users, an ordering criterion CR_O based on the proportional fairness metrics (also called Proportional Fair) is considered. It is possible to show that optimizing such a metrics allows maximizing a cost function corresponding to the sum, on the terminals considered, of the logarithms of the average throughputs respectively associated with these terminals. Such a metric is not detailed further here. At most, it is recalled here that this metrics evolves over time insofar as it allows taking into account the consumption of radio resources allocated by the base station gNB to each terminal UE_i.

It should be noted that the choice of an ordering criterion CR_O corresponding to the proportional fairness metrics constitutes only a variant of implementation of the disclosed technology. Other choices are possible, such as for example an ordering criterion corresponding to any one of the metrics, among: the exponential proportional fairness metrics, the weighted proportional fairness metrics, the fairness metrics Max-Min, the fair queuing metrics (also called Fair Queuing), the maximum throughput metrics, a metrics depending on the services provided to the terminals, etc. A Round Robin-type ordering criterion etc can also be envisaged.

The base station gNB and the terminals $UE\_1, UE\_2, \ldots, UE\_K$ are able to communicate with each other, through a propagation channel CA_P which separates them and within a communication cell (not represented in FIG. 2), whose network coverage is ensured by the base station gNB.

Said communication cell belongs to a wireless communications network (not represented in FIG. 2), support for the communications established between the base station gNB and the terminals $UE\_1, UE\_2, \ldots, UE\_K$. For the remainder of the description, it is considered in a non-limiting manner that said telecommunications network is a 5G-type mobile network offering a communication mode according to an FDD (Frequency Division Duplex) mode. Furthermore, in the present exemplary embodiment, said communication cell corresponds to a macro-cell. However, nothing excludes considering a cell of different size, such as for example a micro-cell, a pico-cell, etc.

These assumptions are not limiting per se, since the disclosed technology also applies to other types of wireless or mobile telecommunications networks, operating in FDD mode but also in TDD (Time Division Duplex) mode. For example, in a 5G network, the disclosed technology can apply to the FDD mode to the channels carrying control data and to the channels carrying payload data. With regard to the TDD mode, and still in the context of a 5G network, the disclosed technology can for example apply:

to the channels carrying control data and to the channels carrying payload data in conditions where the coverage is not good, or to simplify the selection of beams to serve the terminals attached to the base station as presented in detail below, being understood that once said selection has been made, control and/or payload data are transmitted to the terminals other than thanks to the selected beams.

The document by F. Vook et al. titled "MIMO and beamforming solutions for 5G technology", 2014 IEEE MTT-S International Microwave Symposium (IMS2014), describes an example of a 5G network in which the disclosed technology can be applied as indicated above.

In general, those skilled in the art know how to adapt, if need be, the disclosed technology as described here depending on the considered mode (FDD or TDD).

The base station gNB is initially configured to generate, by means of N1 antennas among the M antennas that equip it (N1 being an integer less than or equal to M), N1 transmission beams, these serving as a support for the simultaneous transmission of several data flows to serve a determined portion of the space. The generation of said N1 transmission beams is performed by means of a grid of beams, called "first grid of beams" GoB_1, implemented at the base station gNB.

By way of non-limiting example, it is assumed here that the base station gNB is equipped with M=64 emitting antennas and can cover, via the first grid of beams GoB_1, a portion of the space forming, in the azimuth plane, an angle of 120°. Furthermore, in this example, the first grid of beams GoB_1 includes seven beams F1 to F7, generated by using N1=7 antennas of the base station gNB, according to a configuration identical to the one represented in FIG. 1A, therefore namely that the respective opening angles of the beams are identical and that said beams are uniformly angularly distributed in said azimuth plane. Therefore, two adjacent beams are separated from each other by an angular deviation equal to 20° counted between the main axes of said two beams.

However, nothing excludes considering, according to other examples not detailed here, a grid of beams including a number of beams different from seven and/or angular deviations between the directions of the beams different by 20° as well as possibly not all equal.

In addition, nothing excludes considering a grid whose beams are contained in a plane other than the azimuth plane (such as for example a vertical plane, also referred to as an "elevation plane"), or even beams distributed in several distinct planes.

It should be noted that when the number N1 is less than the total number M of antennas available at the base station, said N1 antennas can all be arranged in the same plane (for example in a horizontal plane or in a vertical plane).

In general, the parameterization of a grid of beams is not necessary to be further described here. Means configured in software (specific computer program) and/or hardware (FPGA, PLD, ASIC, etc.) way, can be used to implement such a first grid of beams GoB_1 at the base station gNB.

FIG. 3 schematically represents an example of hardware architecture of the base station gNB according to the disclosed technology.

The base station gNB has, in the embodiment envisaged here, the hardware architecture of a computer. As illustrated in FIG. 3, the base station gNB includes, in particular, a processor 2, a random access memory 3, a read only memory 4 and a non-volatile memory 5.

The read-only memory 4 of the base station gNB constitutes a recording medium in accordance with the disclosed technology, readable by the processor 2 and on which a computer program PROG_gNB is recorded according to the disclosed technology, including instructions for the execution of the steps of a selection method according to the disclosed technology. The program PROG_gNB defines functional modules of the base station gNB, which are based on or control the hardware elements 3 to 5 of the previously mentioned base station gNB, and which comprise in particular:

a determination module gNB_A, configured to determine a grid GoB_2 of N2 transmission beams intended to cover the portion of the space served by the base station and generated by using said N1 antennas of the base station, N2 designating an integer such that N2>N1, a association module gNB_B, configured to associate each terminal UE_i with a beam of the second grid GoB_2, a selection module gNB_C, configured to select several non-adjacent beams of said grid GoB_2 to transmit data to the terminals UE_1, . . . , UE_K during at least one given time interval.

The set of beams unselected by the selection module gNB_C therefore form a subset of the N2 beams of the second grid GoB_2. "Set of non-adjacent beams" refers here to the fact that any two beams chosen from said set are always separated in a plane of the space that intersects said two beams chosen by at least one of the N2 unselected beams.

The base station gNB further includes communication means 6 allowing it to emit signals over the communication network to other equipment such as in particular to the terminals UE_1, UE_2, . . . , UE_K. These communication means 6 integrate in particular the M emitting antennas TX_1, . . . , TX_M of the base station gNB, as well as means for shaping the signals emitted on the M emitting antennas in accordance with the communication protocol defined on the telecommunications network. More particularly, said communication means 6 are also configured to transmit data to the terminals UE_1, . . . , UE_K during said at least one given time interval.

The base station gNB may further comprise other hardware means (power amplifiers, etc.) not described in further detail here.

FIG. 4 represents, in the form of a flowchart, the main steps of the selection method according to the disclosed technology as implemented by the base station gNB of the wireless communications system 1.

As a reminder, the first grid of beams GoB_1 is here, even before the implementation of said selection method, implemented at the base station gNB for the generation of N1 beams in said determined portion of the space by means of N1 antennas chosen among the M antennas of the base station. Such a configuration of the base station gNB is hereinafter referred to as "initial configuration".

As illustrated in FIG. 4, said selection method firstly includes a step E1 of determining a second grid of beams GoB_2 allowing the generation of N2 beams with the N1 previously chosen antennas of the base station gNB, N2 being (strictly) greater than N1. This determination step E1 is implemented by the determination module gNB_A, so that once said second grid GoB_2 has been determined, the base station gNB is able to generate said N2 beams in said portion of the space.

As mentioned before, the determination of the second grid GoB_2 can be performed by means of a DFT transform (Discrete Fourier Transform) properly dimensioned. In practice, the beams of the first grid GoB_1 being themselves generated by means of a first DFT transform, the determination of the second grid GoB_2 is performed by means of a second DFT transform parameterized so that the angles (the arguments of the trigonometric functions) associated therewith are translated with respect to the angles of said first DFT transform. Such a procedure does not require explanation in detail here.

According to an example of implementation, the N1 beams of the first grid GoB_1 are common to the N2 beams of the second grid GoB_2. Thus, insofar as N2 is greater than N1, the implementation of step E1 can be seen as an oversampling of the first grid GoB_1.

Alternatively, if for example the respective positions of at least part of the terminals UE_1, UE_2, . . . , UE_K are known, only a part of the first grid GoB_1, able to cover said known positions, is oversampled. Thus, in this case, the second grid GoB_2 is determined so that only part of the N1 beams of the first grid GoB_1 is common with said second grid GoB_2.

In any event, whether the set of beams of the first grid GoB_1, or only part of them, are common with those of the second grid GoB_2, the respectively initial and new configurations differ from each other, in particular, in that the beam density associated with the new configuration is greater than the beam density of the initial configuration.

Thus, at the end of step E1, said second grid GoB_2 is implemented (configured) at the base station gNB. This update of the initial configuration of the base station gNB is hereinafter referred to as a "new configuration".

In a particular example of implementation, the initial configuration of the base station gNB is identical to that of FIG. 1A, and the new configuration of said base station gNB is identical to that of FIG. 1B. According to this new configuration, the second grid of beams GoB_2 is suitable for the generation, by the station gNB, of thirteen beams F1 to F13 (N2=13). In addition, two adjacent beams of said second grid GoB_2 are separated from each other by an angular deviation equal to 10°. In other words, the second GoB_2 grid corresponds to an oversampling of the first grid GoB_1 by a factor of 2.

The choice consisting in oversampling the first grid GoB_1 so that the beams of the second grid GoB_2 are separated from each other by an angular deviation equal to 10° however constitutes only one variant of implementation of the disclosed technology. Nothing excludes, for example, considering other values of angular deviations, possibly not all equal to each other. Nothing excludes considering a higher oversampling (N2 greater than 13, for example N2 equal to 2 times or 4 times N1, the inventors having observed that such ratios would allow obtaining a good compromise between the complexity of implementation of the selection method, in terms of computing resources, and performance gain, in terms of data throughput transmitted to the terminals) or a lower oversampling (N2 less than 13).

According to another example of implementation, if the beams of the first grid GoB_1 are contained in several distinct planes, the second grid GoB_2 is determined by oversampling in one, several or even all of said planes.

For example, consider by way of illustration the initial configuration according to which the base station gNB includes an array of antennas comprising Mx.Mz antenna elements, Mx designating the number of antenna elements in each azimuth plane and Mz designating the number of antenna elements in each elevation plane, an antenna element corresponding, in a manner known per se, to an elementary antenna (in other words to an "antenna" within the meaning of the disclosed technology). In other words, according to said initial configuration, at most Mx beams (respectively at most Mz beams) can be generated in each azimuth plane (respectively in each elevation plane). The new configuration of the base station gNB, obtained after implementation of step E1, is then such that the second grid GoB_2 allows generating Mx_NEW beams in each azimuth plane and/or Mz_NEW beams in each elevation plane, Mx_NEW (respectively Mz_NEW) being greater than Mx (respectively Mz) (for example Mx_New is equal to k×Mx and/or Mz_NEW is equal to k'×Mz, k and k' being integers comprised between 2 and 4).

In general, no limitation is attached to the oversampling that can be considered for the first grid GoB_1. In addition, those skilled in the art know how to configure the base station gNB, more particularly its determination module gNB_A, via means configured in software (specific computer program) and/or hardware (FPGA, PLD, ASIC, etc.) way, so that said station gNB can implement step E1, and thus perform an oversampling of the first grid GoB_1.

In the embodiment described here, the selection method includes, at the end of step E1, a step E2 of associating the terminals UE_1, . . . , UE_K with respective beams of the second grid GoB_2. This association step E2 is implemented by the association module gNB_B of the base station gNB.

The association of a terminal UE_i with a beam of the second grid GoB_2 can be performed based for example on information received from said terminal UE_i and reflecting a level of quality of a data transmission towards the terminal UE_i using said beam.

The information sent back by the terminal UE_i can be of different kinds. Thus, it may for example be an index corresponding to the beam optimizing a given quality criterion considered at the terminal (for example, optimizing the instantaneous throughput, the received power, the signal to interference plus noise ratio, etc.), or an indicator of the level of quality of the transmission (also referred to as CQI for "Channel Quality Information"), etc. As a variant, the terminal can send back a set of ordered beam indices corresponding to beams maximizing the quality criterion considered and classified in descending order, the index provided first corresponding to the one optimizing the considered quality criterion (for example the power received by the terminal).

As a variant, the quality criterion can be evaluated by the base station for each terminal based on the quality information sent back by this terminal.

More specifically here, the base station determines, based on the information received from the terminals UE_1, . . . , UE_K, which beam Fj (j being an integer index greater than or equal to 1) among the set of the beams of the second grid GoB_2 must be assigned to which terminal so as to optimize the cost function it seeks to optimize on the cell. It is noted that, in a particular embodiment, the association of the beams with the terminals and the scheduling of the terminals can be performed jointly by the base station according to the algorithm adopted to optimize the cost function. In the embodiment described here, these two steps are carried out sequentially, as described in more detail below.

In the remainder of the description, to facilitate the understanding of the disclosed technology, it is assumed that the set of the beams of the second grid GoB_2 is provided with an order relation defined by the index j of a beam Fj. In other words, said set of beams can be classified in the form of a list, the rank of a beam Fj within this list being given by its index j. It is also assumed, in the embodiment described here, that the information sent back from a terminal UE_i to the base station gNB therefore includes the index j of the beam Fj corresponding to the best power received at the terminal UE_i.

For example, and in a manner known per se, the association step E2 follows the sending, from the base station gNB and towards the terminals UE_1, . . . , UE_K, via each of the beams Fj emitted sequentially (beam sweeping technique), of pilot sequences comprising the indices of the beams from which they are derived. Each terminal UE_i then evaluates, for each of the beams Fj, and based on the pilot sequences it receives, a level of quality of the transmission of the pilot sequences via each of the beams Fj. This quality level corresponds in the embodiment described here to the powers of the pilot sequences received by the terminal UE_i. Then, each terminal UE_i identifies, as a function of the calculations made, the beam Fj optimizing the quality level with regard thereto, in order to finally send back the index of this optimal beam towards the base station gNB. The base station gNB then processes the indices of the beams sent back by the terminals UE_1, . . . , UE_K to deduce the beam/terminal associations which lead to optimum performances of the system 1 for all of said terminals UE_1, . . . , UE_K.

In a variant of embodiment, each terminal UE_i classifies the beams Fj in decreasing order of the calculated quality level and sends back to the base station gNB the indices of a determined number of beams corresponding to the best quality levels. The base station gNB then processes the indices of the beams sent back by the terminals UE_1, . . . , UE_K to deduce the beam/terminal associations which lead to maximum performances of the system 1 for all of said terminals UE_1, . . . , UE_K with regard to the cost function it seeks to optimize on the cell. To this end, it can jointly optimize the cost function by selecting the best beam/terminal associations and terminal scheduling. As a variant, it can use a first ordering criterion to select the best beam/terminal associations, then a second ordering criterion to order the served terminals, the first and the second criterion being able to be identical or different.

It should be noted that the beams identified at first in the information sent back by each of the terminals may differ from the beams that the base station gNB ultimately associates with these terminals at the end of the association step E2. Indeed, the optimization of the cost function considered for the scheduling of the terminals UE_1, . . . , UE_K is carried out by taking into account the quality of transmission of all the terminals and can therefore lead to associating beams with these terminals that differ from those that each of said terminals would choose to optimize the quality of the transmission with regard thereto.

Also, and in general, the base station gNB remains in control of the way in which the beams are associated with the different terminals, in order to optimize the performances of the wireless communication system 1. Thus, the base station gNB may or may not take into account the information received from the terminals UE_1, . . . , UE_K. Moreover, nothing excludes the base station gNB from associating respective beams with the terminals without these sending back information as such on the beams towards said station gNB (it can for example, under some assumptions, be based on an estimation made thereby of the quality of the transmissions on the various beams emitted to the terminals, in particular in the event of reciprocity of the propagation channel).

In accordance with the disclosed technology, the selection method also includes a step E3 of selecting one or more non-adjacent beam(s) Fj of the second grid GoB_2 to transmit data to the terminals UE_1, . . . , UE_K during at least one given time interval INT_s (s being an integer index greater than or equal to 1). In other words, when several beams Fj are selected, said selected beams are separated from each other two by two by at least one unselected beam.

"During at least one time interval" refers here to the fact that only the beam(s) selected in the second grid GoB_2 are intended to be generated simultaneously during said at least one time interval, this aspect being detailed later.

Said at least one time interval corresponds for example to a time interval called Transmission Time Interval (TTI). In a manner known per se, such a time interval TTI represents the smallest unit of time, with regard to the communication protocol implemented within the wireless telecommunications network, during which a terminal can receive or emit data. For example, in the context of the 5G network of the disclosed technology, the duration of said interval TTI takes a value equal to 1 ms (millisecond), 0.5 ms, 0.25 ms, 0.125 ms, etc.

Of course, nothing excludes considering a time interval other than an interval TTI, such as for example a time interval of longer duration than a duration proposed by the communication protocol implemented within the wireless telecommunications network. In general, no limitation is attached to the manner in which said at least one time interval is defined.

In the context of the disclosed technology, if several beams are selected for a time interval, only these selected beams are intended to be generated and emitted simultaneously during said interval to transmit data. Also, the expression according to which beams intended to be generated and emitted simultaneously to transmit data form an "emission pattern" is here introduced. This notion of "emission pattern" can of course be extended to the case where a single beam is selected for a given time interval.

It is noted that the fact of selecting non-adjacent beams of the second grid GoB_2 advantageously allows reducing the overlap of the selected beams when they are generated and emitted simultaneously to transmit data during the time interval with which they are associated, and therefore reduce the interference generated at the terminals associated with the selected beams.

It also noted that nothing excludes beams selected for a time interval from being distant from each other two by two by more than one unselected beam.

The remainder of the description aims at detailing different modes of implementation of the selection method, and more particularly of said selection step E3.

For the remainder of the description, and in order to facilitate the presentation of said modes of implementation, it is considered without limitation that the initial configuration and the new configuration of the base station gNB are respectively identical to those of FIGS. 1A and 1B. In other words, the first grid GoB_1 allows generating the beams F1 to F7 (N1=7), and the second grid GoB_2 allows generating the beams F1 to F13 (N2=13).

It is also assumed that the number of terminals belonging to the communications system 1 is equal to five (K=5). More particularly, said system 1 includes:
- a Terminal UE_1 contained in the single beam F1,
- a Terminal UE_2 contained in the single beam F5,
- a terminal UE_3 contained in the single beam F6,
- a terminal UE_4 contained in the single beam F7,
- a terminal UE_5 contained in the single beam F12.

It is also considered, without limitation, that:
- the ordering criterion CR_O is based on the proportional fairness metrics;
- the quality criterion considered at each terminal is the amount of electromagnetic power received from each of the terminals UE_1, . . . , UE_5. This criterion reflects the level of quality of the data transmitted via the beams towards each of the terminals. To this end, said terminals UE_1, . . . , UE_5 are for example equipped with acquisition means of a type known per se and able to estimate an amount of power received. It is assumed that the information sent back by each terminal UE_i to the base station gNB is the index of the beam optimizing the electromagnetic power received at each terminal. Also, at the end of step E2, and due to the respective positions of said terminals UE_1, . . . , UE_5, it is obtained that the terminal UE_1 is associated with the beam F1, the terminal UE_2 is associated with the beam F5, the terminal UE_3 is associated with the beam F6, the terminal UE_4 is associated with the beam F7 and the terminal UE_5 is associated with the beam F12.

FIG. 5 schematically represents a first mode of implementation of the selection method of FIG. 4 in which the selection step E3 is iterated for a plurality of time intervals INT_1, . . . , INT_Q distinct from each other (Q being an integer greater than 1). "Time intervals distinct from each other" refers here to empty intersection intervals or, alternatively, intervals able to share a common bound, such a distinction not being limiting for the implementation of the selection method according to the disclosed technology.

The iterations of step E3 are for example executed in the chronological order of the time intervals INT_1, . . . , INT_Q, being understood that said chronological order refers to the chronological order of the respective lower bounds of said intervals INT_1, . . . , INT_Q. However, nothing excludes considering, following other examples not detailed here, an order of execution of the iterations that differs from said chronological order.

As illustrated in FIG. 5, the selection step E3 is implemented, in this first mode of implementation, so that a single beam Fj is selected for each time interval INT_s (s being here comprised between 1 and Q) to transmit data towards a single terminal.

Also, and as already mentioned previously, only the beam Fj selected for an interval INT_s is intended to be generated and emitted during said interval INT_s. It will therefore be understood that the selections made during said first mode of implementation aim an SU-MIMO emission ("SU" being the acronym of "Single User") from the base station gNB.

It is noted that in this first mode of implementation, given the fact that a single beam is selected during each iteration, the non-adjacency constraint is automatically satisfied.

According to said first mode of implementation, the selection step E3 is also implemented so that the beam Fj selected for an interval INT_s is the beam associated with an optimizing terminal UE_i, during the iteration of the selection step E3 considered for said time interval INT_s, the cost function optimized according to the ordering criterion CR_O and evaluated on at least part of the plurality of the terminals UE_1, . . . , UE_5.

The number of terminals considered for the evaluation of the cost function optimized by the ordering criterion CR_O is for example predetermined. In the present mode of implementation, the terminals UE_1, . . . , UE_5 being fixed, this predetermined number is preferably equal to five, in other words, the ordering criterion is applied to all the terminals considered. However, nothing excludes considering a number less than five during one, several or even all the iterations of step E3, or even considering a different number from one iteration to another.

In general, no limitation is attached to the number of terminals considered for the application of the ordering criterion, which can further be dynamic if, for example, terminals are mobile and therefore likely to enter (respectively exit) the communication cell associated with the base station gNB.

Finally, no limitation is attached either to the number Q of considered time intervals. Those skilled in the art will indeed understand that this number Q determines the number of iterations carried out during the selection method, the duration of execution of this method not being a limiting factor of the disclosed technology (of course in the condition of ensuring that the considered terminals are served).

In order to give an example of execution of said first mode of implementation, the following assumptions are considered:
- five time intervals INT_1, . . . , INT_5, distinct from each other and corresponding to TTI-type intervals, are considered, said intervals being classified in this order chronologically (INT_2 is subsequent to INT_1, etc.),
- the iterations of step E3 are executed in the chronological order of the time intervals INT_1, . . . , INT_5,
- the ordering criterion CR_O is applied, during each iteration of step E3, on all the terminals UE_1, . . . , UE_5,
- during the first iteration of step E3, the terminals UE_1, . . . , UE_5 are classified, by decreasing proportional fairness metrics, in the following order: UE_3, UE_4, UE_1, UE_5, UE_2, (i.e. the proportional fairness metrics of UE_3 is higher than that of UE_4, etc.).

According to this example of execution, during the first iteration of step E3, for the time interval INT_1, the beam F6 is selected given that it is the beam associated with the terminal UE_3 that maximizes the cost function optimized according to the ordering criterion CR_O. At the end of this iteration, the proportional fairness metrics of the terminal UE_3 becomes lower than that of UE_2, so that the proportional fairness metrics of the terminal UE_4 is now maximum among all the metrics associated with the terminals UE_1, . . . , UE_5. Consequently, the beam selected during the second iteration of step E3, for the time interval INT_2, is the beam F7. In the same manner, it is obtained that the beams selected during the third, fourth and fifth iterations are respectively the beams F1, F12 and F5.

Ultimately, and according to this example of execution, five emission patterns are obtained, each of these patterns being made up of a single beam.

FIG. 6 schematically represents a second mode of implementation of the selection method of FIG. 4 in which:
- the selection step E3 is iterated for a plurality of time intervals INT_1, . . . , INT_Q distinct from each other (Q being an integer greater than 1), a plurality of beams is selected to serve a plurality of terminals attached to the base station gNB during each interval INT_s (s being an index comprised between 1 and Q). It is assumed here that a beam serves a single terminal during a time interval.

All of the possible technical considerations mentioned above in the context of the first mode of implementation (independently of the example of execution described for the latter), and which are related to the topology and to the number of the time intervals, as well as to the order of execution of the iterations of step E3, remain valid here.

Also, and as already been mentioned previously, only the beams selected for an interval INT_s are intended to be generated and emitted during said interval INT_s. It will therefore be understood that the selections made during said second mode of implementation aim a MU-MIMO ("MU" being the acronym of Multiple User) emission from the base station gNB.

According to said second mode of implementation, the selection step E3 is implemented so that the beams F1 to F13 are grouped together, according to their respective indices, in predetermined sets A_1, . . . , A_Z (Z being an integer index greater than or equal to 1). In addition, the beams selected for each time interval INT_s are the beams belonging to one of said predetermined sets A_1, . . . , A_Z, being understood that, preferably, the beams selected for two distinct intervals belong respectively to two distinct sets.

Of course, it is recalled here that the constraint of non-adjacency of the selected beams must be satisfied during the implementation of step E3, which implies that no set A_z (z being an integer index comprised between 1 and Z) is defined arbitrarily.

In order to give an example of execution of said second mode of implementation, the following assumptions are considered:

two time intervals INT_1 and INT_2, distinct from each other and corresponding to TTI-type intervals, are considered, said intervals being classified in this order chronologically (INT_2 is subsequent to INT_1), the iterations of step E3 are executed in the chronological order of the time intervals INT_1 and INT_2, the ordering criterion CR_O is applied only during the first iteration of step E3, on all the terminals UE_1, . . . , UE_5, the terminals UE_1, . . . , UE_5 are classified, by decreasing proportional fairness metrics, in the following order: UE_3, UE_4, UE_1, UE_5, UE_2, two sets of beams A_1 and A_2 are considered, A_1 grouping together the beams of odd indices and A_2 grouping together the beams of even indices.

According to this example of execution, during the first iteration of step E3, for the time interval INT_1, the respective indices of the selected beams all have an identical parity which corresponds to the parity of the index of the beam Fj associated with the terminal UE_i whose proportional fairness metrics is maximum, among all the metrics associated with the terminals UE_1, . . . , UE_5, during the first iteration of step E3. In other words, this metrics being maximum for UE_3 (which is associated with F6), the beams of the set A_2 are selected for the interval INT_1, that is to say the beams F2, F4, F6, F8, F10 and F12.

Then, during the second iteration of step E3, for the time interval INT_2, the beams of the set A_1 are selected. This time it is therefore the beams F1, F3, F5, F7, F9, F11 and F13.

Ultimately, and according to this example of execution, two emission patterns are obtained, namely a first emission pattern consisting of the beams of the set A_1, and a second emission pattern consisting of the beams of the set A_2.

The previous example of execution of the second mode of implementation can be generalized in the case where any number Q (Q>1) of time intervals is considered, and where the number of predetermined sets is equal to said number Q. Indeed, if the beams selected during the first iteration of step E3 are for example the beams whose respective indices are congruent to q module Q (q being an index comprised between 0 and Q−1), the indices of the beams selected during the iteration of rank p (p being an index comprised between 2 and Q) of step E3 are then for example congruent to q−1+p module Q.

FIG. 7 schematically represents a third mode of implementation of the selection method of FIG. 4. Said third mode of implementation incorporates part of the characteristics of the second mode of implementation (FIG. 6), namely that:

the selection step E3 is iterated for a plurality of time intervals INT_1, . . . , INT_Q distinct from each other (Q being an integer greater than 1), a plurality of beams is selected to serve a plurality of terminals attached to the base station gNB during each interval INT_s (s being an index comprised between 1 and Q). It is assumed here that during a time interval, a beam serves a single terminal.

The selections made during said third mode of implementation aim, as in the case of the second mode of implementation (FIG. 6), a MU-MIMO emission from the base station gNB.

All the possible technical considerations mentioned above in the context of the first and/or the second mode of implementation (independently of the examples of execution described for these first and second modes), and which are related to the topology and to the number of time intervals, as well as to the order of execution of the iterations of step E3, remain valid here.

According to said third mode of implementation, the selection step E3 includes a sub-selection E3_10 of the beam Fj associated with a terminal UE_i optimizing, during the implementation of said sub-selection, the cost function optimized according to the ordering criterion CR_O and evaluated on at least part of said plurality of terminals UE_1, . . . , UE_5.

It is also recalled here that the constraint of non-adjacency of the selected beams must be satisfied during the implementation of step E3. To this end, and on the one hand, said sub-selection E3_10 is iterated at most a number of times N3. On the other hand, said at least part of terminals considered during an iteration of the sub-selection E3_10 is formed of terminals whose associated beams are separated from the beams selected during previous iterations by at least one beam.

In general, those skilled in the art know how to parameterize the number N3 so that a plurality of beams can be selected for each interval INT_s and that the non-adjacency constraint is satisfied.

According to a particular example, if the base station is configured to emit simultaneously N4 transmission beams, the number N3 is equal to N4. Proceeding in this way advantageously allows limiting the (electronic, software) complexity of implementation of the disclosed technology, and therefore ultimately limiting the production cost thereof.

In order to give an example of execution of said third mode of implementation, the following assumptions are considered:

two time intervals INT_1 and INT_2, distinct from each other and corresponding to TTI-type intervals, are considered, said intervals being classified in this order chronologically (INT_2 is subsequent to INT_1), the iterations of step E3 are executed in the chronological order of the time intervals INT_1 and INT_2, during the first iteration of step E3, the terminals UE_1, ..., UE_5 are classified, by decreasing proportional fairness metrics, in the following order: UE_3, UE_4, UE_1, UE_5, UE_2, for each iteration of step E3, the sub-selection E3_10 is iterated at most three times (N3=3).

According to this example of execution, two iterations of step E3 are implemented, namely a first iteration for the time interval INT_1 and a second iteration for the interval INT_2. In addition, each iteration of step E3 includes several iterations of the sub-selection E3_10.

More particularly, with regard to the first iteration of the sub-selection E3_10 of the first iteration of step E3, the beam F6 is selected given that it is the beam associated with the terminal UE_3 that maximizes the cost function optimized according to the ordering criterion CR_O. At the end of this iteration, the proportional fairness metrics of the terminal UE_3 becomes lower than that of UE_2, so that the terminals UE_1, ..., UE_5 are now classified, by decreasing proportional fairness metrics, in the following order: UE_4, UE_1, UE_5, UE_2, UE_3.

The terminals considered during the second iteration of sub-step E3_10 (still during the first iteration of step E3) are: UE_1, UE_3 and UE_5. It is noted that UE_2 and UE_4 cannot be considered for this second iteration insofar as they are respectively associated with the beams F5 and F7 that are adjacent to F6, the latter having been selected during the first iteration. The beam F1 is therefore selected given that it is the beam associated with the terminal UE_1 which, on the one hand, maximizes the cost function optimized according to the ordering criterion CR_O during the second iteration of the sub step E3_10, and which, on the other hand, is not adjacent to F6. At the end of this iteration, the proportional fairness metrics of the terminal UE_1 becomes lower than that of UE_3, so that the terminals UE_1, ..., UE_5 are now classified, by decreasing proportional fairness metrics, in the following order: UE_4, UE_5, UE_2, UE_3, UE_1.

Therefore, for the third iteration of sub-step E3_10 (still during the first iteration of step E3), and for reasons identical to those mentioned above, the terminals UE_2 and UE_4 are excluded. Consequently, the beam F12 is selected given that it is the beam associated with the terminal UE_5 which, on the one hand, maximizes the cost function optimized according to the ordering criterion CR_O during the third iteration of sub-step E3_10, and which, on the other hand, is not adjacent to F1 and F6. At the end of this iteration, the proportional fairness metrics of the terminal UE_5 becomes lower than that of UE_1, so that the terminals UE_1, ..., UE_5 are now classified, by decreasing proportional fairness metrics in the following order: UE_4, UE_2, UE_3, UE_1, UE_5.

The maximum number of iterations of the sub-selection step E3_10 having been reached for the first iteration of step E3 (N3=3), a second iteration of step E3 is executed for the interval INT_2. The implementation of this second iteration of step E3 is similar to the one described above for the first iteration of step E3, knowing that the updated classification of the terminals must now be taken into account. It is then obtained, at the end of this second iteration of step E3, that the beams F7 and F5 are selected in this order during two iterations of the sub-step E3_10.

Ultimately, and according to this example of execution, two emission patterns are obtained, namely a first emission pattern consisting of the beams F1, F6 and F12, and a second emission pattern consisting of the beams F5 and F7.

The disclosed technology has been described so far by considering a plurality of time intervals distinct from each other as well as the fact that the selection step E3 was iterated for each of these time intervals. The disclosed technology however remains applicable to the case where only one time interval is considered, one or more beam(s) being able to be selected for said time interval, during a selection step E3 implemented according to considerations similar to those described above (such as for example in the first, second and third modes of implementation).

The disclosed technology has also been described so far by considering that during a mode of implementation (first, second or even third mode of implementation), each iteration of step E3 was executed according to technical characteristics identical to the characteristics applied during previous iterations.

For example, if a single beam is selected during a first iteration (such as for example in the first mode of implementation), the same applies for the subsequent iterations. According to another example, if several beams are selected during a first iteration (such as for example in the third mode of implementation), the same applies again for the subsequent iterations.

However, the disclosed technology also covers the possibility according to which one or more of said iterations differ from each other in that their respective implementations involve different technical characteristics (i.e. under distinct modes of implementation).

Thus, by way of non-limiting example, one or more selection step(s) during which a plurality of beams are selected are implemented for only part of the time intervals considered. Concerning the other time interval(s), one or more selection step(s) during which a single beam is selected are implemented.

By way of illustration, as an alternative to the example of execution detailed above for the third mode of implementation, and by incorporating the assumptions of this example of execution, the first emission pattern consisting of the beams F1, F6 and F12 is determined during the first iteration of step E3. Thus, only the beams F5 and F7 have not yet been selected at the end of the first iteration. They are then selected during respectively two iterations of step E3 executed in accordance with the first mode of implementation detailed above. It will therefore be understood that in this example three time intervals are considered (INT_1 for the pattern F1, F6 and F12, INT_2 for the pattern F7, and INT_3 for the pattern F5).

In general, if several iterations of step E3 are considered, each iteration can be implemented according to any of the modes of implementation described above, provided that the combination of said modes, through said iterations of step E3, is technically operative (i.e. compliance with the constraint of non-adjacency of the beams selected during an iteration of step E3, effective possibility of selecting several beams during an iteration if necessary, etc.).

Furthermore, the disclosed technology has also been described so far by considering modes of implementation in which the terminals were respectively associated with beams of the second grid GoB_2, via said association step E2. The disclosed technology however remains applicable to the case where such an association step E2 is not implemented. In other words, said association step E2 is not essential to the disclosed technology.

By way of illustration, as an alternative to the example of execution detailed above for the second mode of implementation (FIG. 6), the following assumptions are considered:

two time intervals INT_1 and INT_2, strictly distinct from each other and corresponding to TTI-type intervals, are considered, said intervals being classified in this order chronologically (INT_2 is subsequent to INT_1), the iterations of step E3 are executed in the chronological order of the time intervals INT_1 and INT_2, two sets of beams A_1 and A_2 are considered, A_1 grouping together the beams of odd indices and A_2 grouping together the beams of even indices.

According to this alternative example of execution, the order in which the sets A_1 and A_2 are considered for said intervals INT_1 and INT_2 is predetermined. Thus, the beams of the set A_1 are selected for the interval INT_1. The beams of the set A_2 are for their part selected for the interval INT_2. Thus, the order of the emission patterns is now reversed with respect to the order obtained above for said second mode of implementation. It is then understood that in this alternative example of execution, it is no longer necessary to know the parity of the index j associated with the terminal UE_i maximizing the cost function optimized according to the ordering criterion CR_O during the first iteration of step E3.

Furthermore, the disclosed technology has also been described so far by considering modes of implementation in which the terminals send back to the base station a single beam optimizing at each of these terminals the quality of the transmission towards each of these terminals. However as a variant, as mentioned above, each terminal can send back a plurality of indices corresponding to the first P beams maximizing the quality of the transmission towards this terminal, P designating an integer greater than 1 (for example P less than or equal to 5). In this case, the base station gNB may, during the optimization of the cost function corresponding to the ordering criterion chosen to select the terminals served during a time interval, be made to associate a beam with a terminal which does not necessarily correspond to the beam optimizing the quality of the transmission at this terminal. Indeed, selecting and activating the best beam for each terminal can lead to increase the interference at the terminals and to reduce the power that can be emitted on each beam. In addition, it may delay the transmission of data towards some terminals. It is therefore possible to envisage, during the optimization of the cost function, that the base station gNB associates with some terminals the beams corresponding to the 2nd (or 3rd, etc.) choice of these terminals (that is to say to the indices sent back in 2nd or 3rd choice, etc. to the base station). Thus, according to this variant, the base station gNB optimizes the cost function by considering several possible configurations of associations between the beams and the terminals, some associations being based on the second, third, etc. choice of the beams made by the terminals.

In addition, and according to another aspect, the disclosed technology also relates to a method for transmitting, by the base station gNB of the wireless communications system 1, data to at least one terminal UE_i. Said transmission method is advantageously based on the selection method described above in order to improve the operation of said at least one terminal UE_i, in comparison with the solutions of alternative embodiments.

FIG. 8 represents, in the form of a flowchart, the main steps of the transmission method according to the disclosed technology as implemented by the base station gNB.

As illustrated in FIG. 8, said transmission method firstly includes a step H1 of selecting at least one transmission beam Fj to transmit data to said at least one terminal UE_i according to a selection method according to the disclosed technology.

The transmission method also includes a step H2 of transmitting data to said at least one terminal by means of said at least one selected beam. This transmission step H2 is implemented by the communication means 6 of the base station gNB.

In a particular mode of implementation (not represented in FIG. 8), a plurality of time intervals is considered, the obtaining H1 and transmission H2 steps being iterated for each of said time intervals.

For example, the selection step H1 is performed during each of said time intervals. An emission pattern is therefore obtained for each interval and is applied by the base station gNB during said interval. Such an example finds a particularly advantageous application in the case where the time intervals are of the TTI type and where the emission method is executed in real time.

Of course, the disclosed technology also covers the case where a plurality of time intervals is considered, and where the set of the emission patterns respectively associated with these intervals are determined during the obtaining step H1, before any implementation of the transmission step H2.

In the foregoing description, specific details are given to provide a thorough understanding of the examples. However, it will be understood by one of ordinary skill in the art that the examples may be practiced without these specific details. Certain embodiments that are described separately herein can be combined in a single embodiment, and the features described with reference to a given embodiment also can be implemented in multiple embodiments separately or in any suitable subcombination. In some examples, certain structures and techniques may be shown in greater detail than other structures or techniques to further explain the examples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for selecting, by a multi-antenna base station of a wireless communications system, at least one transmission beam to transmit data to at least one terminal, the method comprising:

determining a grid of N2 transmission beams intended to cover a portion of the space served by the base station and generated by using N1 antennas of the base station, where N1 and N2 designating integers such that N2>N1, and selecting one or more non-adjacent beams of the grid to transmit data to at least one terminal during at least one given time interval.

2. The method according to claim 1, wherein:

the selecting of one or more non-adjacent beams is iterated for a plurality of time intervals, and a single beam associated with at least one terminal is selected for each time interval to transmit data to the at least one terminal associated with the beam, the selected beam and the at least one associated terminal optimizing a cost function during the iteration of the selecting of one or more non-adjacent beams considered for the time interval.

3. The method of claim 1, the method further comprising, prior to the selecting of one or more non-adjacent beams, associating a plurality of terminals with respective beams of the grid, wherein:
the selecting of one or more non-adjacent beams is iterated for a plurality of time intervals, and
a single beam is selected for each time interval, the selected beam being the beam associated with at least one terminal optimizing, during the iteration of the selecting of one or more non-adjacent beams considered for the time interval, a given ordering criterion applied to at least part of the plurality of terminals.

4. The method of claim 3, wherein the ordering criterion corresponds to at least one of the following metrics:
a proportional fairness metric, an exponential proportional fairness metric or a weighted proportional fairness metric;
a Max-Min fairness metric;
a metric depending on services provided to the terminals;
a fair queuing metric, and
a maximum throughput metric.

5. The method of claim 1, wherein a plurality of beams is selected to serve a plurality of terminals attached to the base station during the at least one time interval.

6. The method of claim 5, wherein the beams are associated with distinct respective indices, the beams being grouped, based on their respective indices, in predetermined sets, the beams selected for the at least one time interval being the beams belonging to one of the predetermined sets.

7. The method of claim 5, wherein the selecting of one or more non-adjacent beams comprises a sub-selection of the beam associated with at least one terminal optimizing, during the implementation of the sub-selection, a cost function evaluated on at least part of the plurality of terminals, the sub-selection being iterated at most a determined number of times N3, and the at least part of terminals considered during an iteration of the sub-selection being formed of terminals whose associated beams are separated from the beams selected during the previous iterations by at least one beam.

8. The method of claim 5, the method including, prior to the selecting of one or more non-adjacent beams, associating the plurality of terminals with respective beams of the grid, the selecting of one or more non-adjacent beams including a sub-selection of the beam associated with a terminal optimizing, during the implementation of the sub-selection, a given ordering criterion applied to at least part of the plurality of terminals, the sub-selection being iterated at most a determined number of times N3, and the at least part of terminals considered during an iteration of the sub-selection being formed of terminals whose associated beams are separated from the beams selected during the previous iterations by at least one beam.

9. The method of claim 8, wherein the base station is configured to simultaneously emit N4 transmission beams, the number N3 being equal to N4.

10. The method of claim 5, wherein the selecting of one or more non-adjacent beams is iterated for a plurality of time intervals distinct from each other.

11. A method for transmitting data to at least one terminal by a multi-antenna base station of a wireless communications system, the method including:
selecting at least one transmission beam to transmit data to the at least one terminal according to the selection method of claim 1; and
transmitting data to the at least one terminal by means of the at least one selected beam.

12. A non-transitory computer-readable medium having stored thereon instructions, which when executed by a processor, cause the processor to implement the method of claim 1.

13. A computer comprising a processor and a memory, the memory having stored thereon instructions, which when executed by the processor, cause the computer to implement the method of claim 1.

14. A multi-antenna base station of a wireless communications system, the base station configured to
determine a grid of N2 transmission beams intended to cover a portion of the space served by the base station and generated by using N1 antennas of the base station, N1 and N2 designating integers such that N2>N1,
select one or more non-adjacent beams of the grid to transmit data to the at least one terminal during at least one given time interval, and
transmit the data to the at least one terminal during the at least one given time interval.

15. A wireless communications system, comprising:
the base station of claim 14; and
at least one terminal attached to the at least one base station.

* * * * *